(12) United States Patent
Awadin et al.

(10) Patent No.: US 12,452,858 B2
(45) Date of Patent: Oct. 21, 2025

(54) SYSTEM AND METHOD FOR RESOURCE BLOCK DETERMINATION FOR MULITCAST AND BROADCAST TRANSMISSIONS

(71) Applicant: Samsung Electronics Co., Ltd., Suwon-si (KR)

(72) Inventors: Mohamed Awadin, Plymouth Meeting, PA (US); Jung Hyun Bae, San Diego, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 574 days.

(21) Appl. No.: 17/886,391

(22) Filed: Aug. 11, 2022

(65) Prior Publication Data

US 2023/0083445 A1 Mar. 16, 2023

Related U.S. Application Data

(60) Provisional application No. 63/241,221, filed on Sep. 7, 2021.

(51) Int. Cl.
*H04L 5/00* (2006.01)
*H04W 4/06* (2009.01)
(Continued)

(52) U.S. Cl.
CPC ....... *H04W 72/1263* (2013.01); *H04L 5/0044* (2013.01); *H04W 4/06* (2013.01); *H04W 72/121* (2013.01); *H04W 72/23* (2023.01)

(58) Field of Classification Search
None
See application file for complete search history.

(56) References Cited

U.S. PATENT DOCUMENTS

2009/0207773 A1 8/2009 Feng et al.
2010/0278094 A1 11/2010 Lee et al.
(Continued)

OTHER PUBLICATIONS

CMCC: "Discussion on group scheduling mechanisms," R1-2101063, 3rd Generation Partnership Project (3GPP), Jan. 2021, 17 pages, Retrieved from the Internet: URL:https://ftp.3gpp.org/tsg_ran/WG1_RL1/TSGR1_104-e/Docs/R1-2101063.zip.
(Continued)

*Primary Examiner* — Minh Trang T Nguyen
(74) *Attorney, Agent, or Firm* — Lewis Roca Rothgerber Christie LLP

(57) ABSTRACT

Described herein are systems and methods for resource block determination for multicast and broadcast transmissions. According to various embodiments, a unicast physical downlink shared channel (U-PDSCH) transmission and a group common physical downlink shared channel (GC-PDSCH) transmission are received; a resource block (RB) configuration for decoding the U-PDSCH transmission and GC-PDSCH transmission is determined, wherein the RB configuration specifies a mapping of at least one of the U-PDSCH and the GC-PDSCH to one or more RB collections; and the GC-PDSCH within a Common Frequency Resource (CFR) in decoded according to the RB configuration. According to various embodiments, the determined RB configuration includes a specification of size and location for the one or more RB collections which at least one of the U-PDSCH and the GC-PDSCH is mapped to. In various embodiments, RB collection size and location may be determined relative to CRB indexes and/or a CFR.

20 Claims, 10 Drawing Sheets

(51) Int. Cl.
*H04W 72/121* (2023.01)
*H04W 72/1263* (2023.01)
*H04W 72/23* (2023.01)

(56) References Cited

U.S. PATENT DOCUMENTS

| | | | |
|---|---|---|---|
| 2011/0058511 A1 | 3/2011 | Kim et al. | |
| 2011/0064016 A1 | 3/2011 | Kim et al. | |
| 2011/0149832 A1 | 6/2011 | Kim et al. | |
| 2022/0132522 A1* | 4/2022 | Wei | H04W 72/23 |
| 2022/0322397 A1* | 10/2022 | Liu | H04W 72/1273 |
| 2023/0097512 A1* | 3/2023 | Yao | H04L 5/0053 370/329 |
| 2024/0235745 A1* | 7/2024 | Yoshioka | H04L 1/1896 |

OTHER PUBLICATIONS

Intel Corporation: "NR MBS Group Scheduling for RRC_CONNECTED UEs," R1-2100674, 3rd Generation Partnership Project (3GPP), Jan. 2021, 9 pages, Retrieved from the Internet: URL:https://ftp.3gpp.org/tsg_ran/WG1_RL1/TSGR1_104-e/Docs/R1-2100674.zip.

Moderator (CMCC): "Summary#3 on NR Multicast and Broadcast Services," R1-2007341, 3rd Generation Partnership Project (3GPP), Aug. 2020, 66 pages, Retrieved from the Internet: URL:https://ftp.3gpp.org/tsg_r an/WG1_RL1/T SGR1_102- e/Docs/RI-2007341.zip.

Nokia et al.: "Group Scheduling Mechanisms to Support 5G Multicast / Broadcast Services for RRC_CONNECTED UEs," R1-2106662, 3rd Generation Partnership Project (3GPP), Aug. 2021, 18 pages, Retrieved from the Internet: URL:htSGR1_106-tps://fe/Doctp.3gpp.org/ts/R1-2106662.zip.

Qualcomm Incorporated: "View on group scheduling for Multicast RRC_CONNECTED UEs," R1-2101487, Brd Generation Partnership Project (3GPP), Jan. 2021, 9 pages, Retrieved from the Internet: URL: https://ftp.3gpp.org/tsg_r an/WG1_RL1/T SGR1_104- e/Docs/RI-2101487.zip.

Samsung: "Support of group scheduling for RRC_CONNECTED UEs," R1-2106912, 3rd Generation Partnership Project (3GPP), Aug. 2021, 8 pages, Retrieved from the Internet: URL:https://ftp.3gpp.org/tsg_ran/WG1_RL1/T SGR1_106-e/Docs/RI-2106912.zip.

EPO Extended European Search Report dated Jan. 25, 2023, issued in corresponding European Patent Application No. 22194314.5 (12 pages).

* cited by examiner

SYSTEM AND METHOD FOR RESOURCE BLOCK DETERMINATION FOR MULITCAST AND BROADCAST TRANSMISSIONS

PRIORITY

This application is based on and claims priority under 35 U.S.C. § 119(e) to a U.S. Provisional Patent Application filed on Sep. 7, 2021, in the United States Patent and Trademark Office (USPTO) and assigned Ser. No. 63/241,221, the entire contents of which are incorporated herein by reference.

FIELD

The present disclosure relates generally to common frequency resource synchronization, and more particularly, to physical downlink control channel (PDCCH) and physical downlink shared channel (PDSCH) monitoring based on user equipment (UE) capabilities.

BACKGROUND

In communication systems, a user equipment (UE) interacts with a base station (BS) to send and receive signal transmissions. The 5G New Radio (NR) configuration developed by the 3$^{rd}$ Generation Partnership Project (3GPP) provide global standards for the 5$^{th}$ Generation (5G) iteration of mobile networking technologies. Standards developed as part of the 5G NR configuration include technical specifications for interactions between a UE and a BS. Some standards relate to formats for dispatching wireless signals from a BS to a UE, and vice-versa. For example, a physical downlink shared channel (PDSCH) is a physical channel through which coded data may be transmitted between a BS and a UE.

Data sent between the UE and BS may be formatted as a set of resource blocks (RB) with each RB carrying a set of resource elements (RE) to be received by a device. Each RB may span OFDM symbol, for example in PDSCH, some OFDM symbols may correspond to a data frame and others correspond to a control frame for providing a configuration for processing the data frame. For the reception of PDSCH, the resource blocks may be further grouped into larger collections of resource blocks, such as resource block groups (RBG), RB bundles, precoding resource block groups (PRG), etc. The "sizes" of these RB collections may be determined based on the size of the BWP used for the reception of PDSCH, the scheduling DCI format, or/and the explicitly provided configurations.

Transmissions between a UE and a BS may be in a unicast (also called "point-to-point") and/or multicast and/or broadcast format. In a unicast format, a direct one-to-one data correspondence is established and facilitated between the UE and BS. The multicast and/or broadcast format allowed the BS to transmit data to many UEs in a group in a one-to-many manner, according to techniques for multicast and broadcast services (MBS). Throughout this application, multicast and broadcast and MBS will be used interchangeably. UE and BS may utilize both unicast and multicast capabilities to interact with each other differently depending on the data and manner of transmission. Techniques such as frequency-division multiplexing (FDM) may allow for the simultaneous or near-simultaneous transmission and reception of both unicast and multicast signals. Also, time-division multiplexing (TDM) may allow for the reception of unicast and multicast signals in TDM manner, i.e., the UE receives either unicast or multicast.

Release 17 of the NR standards created the concept of common frequency resource (CFR), through which a group of UEs are utilize MBS reception of signals. Through CFR, UE may receive group common PDSCH (GC-PDSCH) signals within a UE's dedicated unicast-based bandwidth part (BWP) to allow for the FDM or TDM reception of both unicast and multicast signals. Due to the technical differences between unicast and multicast signals, it is important that the corresponding resource blocks for each type of signal or channel be as non-disruptive as possible among the UEs within a MBS group in order to promote efficient MBS reception.

SUMMARY

Described herein are novel methods and systems for generating and implementing domain-efficient RB groupings. Also described herein are methods and systems for implementing improved UE behavior for the generated RB groupings when facilitating both unicast and multicast operations.

More specifically, described are procedures to define the MBS RBGs, MBS RB bundles, and MBS PRGs using novel approaches to determine domain-based sizes, the associated RBs within the CFR, and to align the parameters used to determine the interleaved MBS PDSCH allocation types. Also described herein are procedures to implement the unicast RBG, unicast RB bundle, and unicast PRG when CFR boundaries are not aligned by applying scheduling resections on those unicast RBG, unicast bundle, and unicast PRG and CFR boundaries or dividing those unicast RBG, unicast bundle, and unicast PRG around CFR boundaries to avoid scheduling restrictions.

When implementing both unicast and multicast signal transmissions, the proposed solutions described herein prevent domain misalignments among any UEs in the same multicast MBS group. Specifically, all UEs in the same MBS group can determine proper sets of allocated resources for GC-PDSCH based on scheduling and precoding granularity. In this manner, the same precoding assumptions are guaranteed among the UEs in the same MBS group to prevent misalignments that would otherwise disrupt transmission services among the UE group.

According to an embodiment of the present disclosure, there is provided a method, including: receiving a unicast physical downlink shared channel (U-PDSCH) transmission and a group common physical downlink shared channel (GC-PDSCH) transmission; determining a resource block (RB) configuration for decoding the U-PDSCH transmission and GC-PDSCH transmission, wherein the RB configuration specifies a mapping of at least one of the U-PDSCH and the GC-PDSCH to one or more RB collections; and decoding the GC-PDSCH within a Common Frequency Resource (CFR) according to the RB configuration. In some embodiments, the determined RB configuration includes a specification of size and location for the one or more RB collections which at least one of the U-PDSCH and the GC-PDSCH is mapped to.

In some further embodiments, the size and location of the one or more RB collections is determined based at least in part on a common resource block (CRB) and the start and size of the CFR, wherein a first and last group of RBs in the RB collections have different sizes than remaining groups of RBs in the RB collections.

In some further embodiments, the size of the one or more RB collections is determined based at least in part on the CFR of the GC-PDSCH transmission.

In some further embodiments, the one or more resource block collections are organized as resource block groups (RBG) for the GC-PDSCH and having a size provided by a higher layer signalling and determined separately from the RBG size for the U-PDSCH.

In some further embodiments, the one or more resource block collections are organized as RBG for the GC-PDSCH and having a size that is not separately configured, wherein a configured size of the RBG for U-PDSCH is used as the size of the PBG for GC-PDSCH.

In some further embodiments, the one or more RB collections are organized as RB bundles corresponding to the interleaved-mapping or non-interleaved-mapping for the GC-PDSCH and has a size provided by a higher layer signalling determined separately from the size for the U-PDSCH. In some further embodiments, the interleaved-mapping includes a parameter corresponding to a number of bundles within the CFR.

In some further embodiments, the one or more resource block collections are organized as precoding RB groups corresponding to a precoding granularity size for the GC-PDSCH that can be separately configured from a size used for U-PDSCH; and the one or more resource block collections are organized as precoding RB groups corresponding to a precoding granularity size for the GC-PDSCH and the precoding granularity size is a precoding granularity size of the U-PDSCH. In some further embodiments, the precoding granularity size for the GC-PDSCH is of a predefined size of 2 blocks and according to DCI format 4_0 or DCI format 4_1.

BRIEF DESCRIPTION OF THE DRAWINGS

The above and other aspects, features, and advantages of certain embodiments of the present disclosure will be more apparent from the following detailed description, when taken in conjunction with the accompanying drawings, in which.

DETAILED DESCRIPTION

Figure 1:
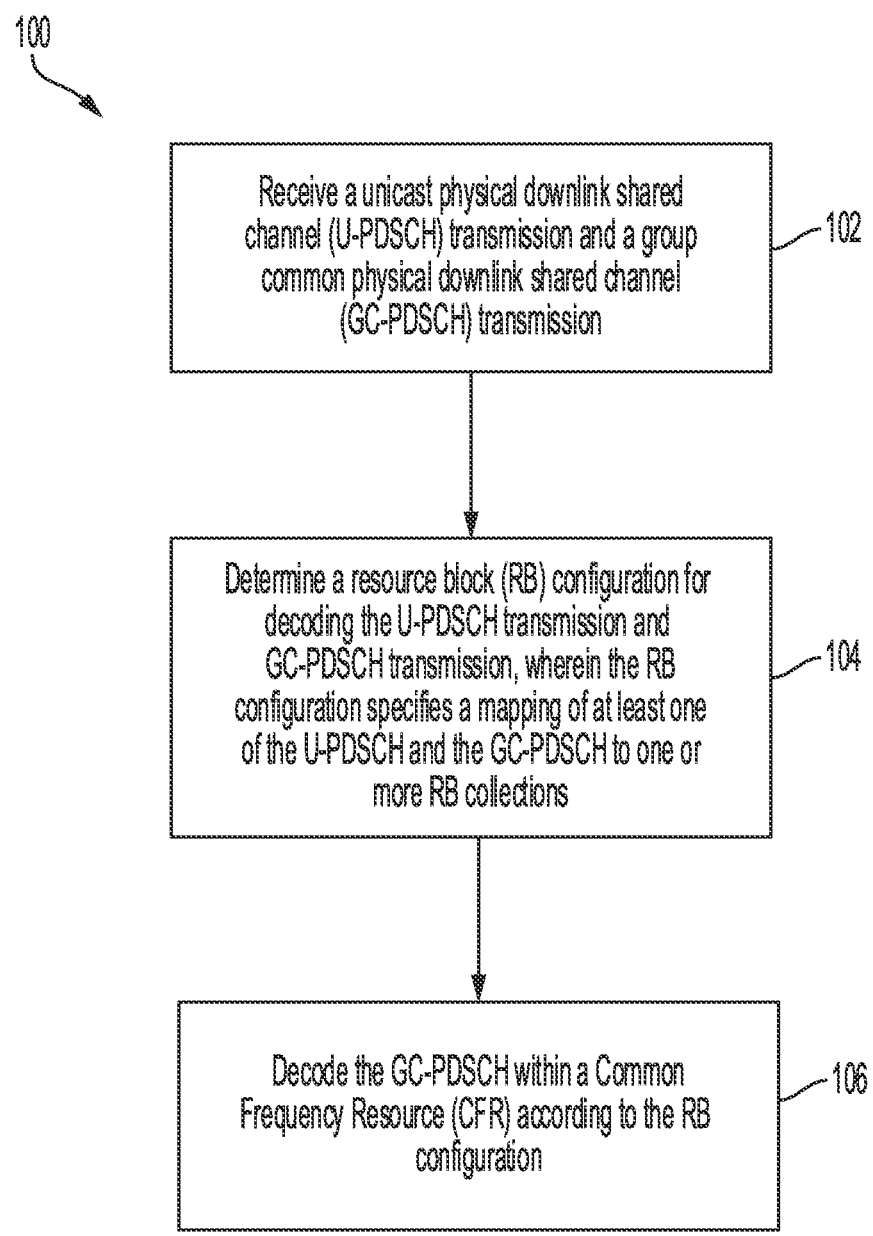
FIG. 1 is a flowchart illustrating an example process for decoding a GC-PDSCH according to a determined RB configuration.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As described throughout the application, terms including acronyms may be read to be in the singular or plural form where appropriate. For example, the acronym RB for "resource block" may also be read as "resource blocks," and other terms may subscribe to this same convention.

As described herein, a BS is a Base Station. The terms gNB (Next Generation NodeB device) may be used interchangeably with BS for the purposes of this application. A Base Station may be a hardware device functioning as a node operating as a transceiver for sending and receiving wireless signals. For example, a BS may be a fixed-location transceiver for distributing and receiving transmissions to and from various client devices.

As described herein, a BWP is a BandWidth Part. The BWP is a 5G New Radio feature capable of dynamically adapting a bandwidth in which a client device functions. A BandWidth Part may be, for example, a contiguous sequence of physical resource blocks and according to a defined numerology.

As described herein, a CFR is a Common Frequency Resource. A Common Frequency Resource is a 5G New Radio paradigm for which multiple client devices may perform a common Multicast and Broadcast Service transmission reception. A CFR may span a contiguous sequence of resource blocks designated for facilitating MBS for multiple UEs.

As described herein, a CRB is a Common Resource Block. A Common Resource Block one or more sets of continuous blocks which are numbered according to a frequency domain as part of a 5G New Radio configuration. A CRB starts a "Point A" aligned with a corresponding subcarrier spacing.

As described herein, a DCI is a Downlink Control Information. Downlink Control Information is a set of data/signals in a control channel sent to a client device to support the scheduling of a downlink shared channel transmission. A DCI may be encoded and sent to the client device through a physical downlink control channel as part of a 5G operation.

As described herein, a DL is a Downlink. A Downlink may be, for example, a channel that carries user data and other information, such as information regarding system blocks as part of 5G transmissions.

As described herein, FDM is Frequency Division Multiplexing. FDM may be a communications-related paradigm for transmitting a plurality of signals over a common channel. The use of FDM may, for example, allow for the transmission of unique frequencies for each unique signal to allow for the simultaneous transmission on a common medium.

As described herein, GC-PDSCH is Group-Common Physical Downlink Shared Channel. GC-PDSCH may be, for example, a physical downlink shared channel associated with a Multicast and Broadcast Service operation that may be performed with respect to one or more client devices.

As described herein, a MBS is a Multicast and Broadcast Services. Multicast and Broadcast Services are single-point-to-multipoint services used in 5G New Radio operations to transmit similar content to multiple client devices. MBS may work in accordance with a CFR for decoding a GC-PDSCH transmission in a device slot.

As described herein, OFDM is Orthogonal Frequency Domain Multiplexing. Orthogonal Frequency Domain Multiplexing is a type of digital transmission for the encoding of data on one or more carrier frequencies. OFDM may be use in various 5G-related operations through the combination of quadrature amplitude modulation and FDM.

As described herein, a PDCCH is a Physical Downlink Control Channel. A Physical Downlink Control Channel is a channel that carries downlink control data for the scheduling of downlink transmissions on a physical downlink shared channel and uplink data on a physical uplink shared channel.

As described herein, a PDSCH is a Physical Downlink Shared Channel. A Physical Downlink Shared Channel is a physical channel for carrying data according to time-based and/or frequency based items of data.

As described herein, a PRB is a Physical Resource Block. A Physical Resource Block is a paradigm describing slot resources spanning a number (usually twelve) of consecutive subcarriers of spacing according to a variable frequency.

As described herein, a PRG is a Precoding Resource block Group. A Precoding Resource block Group is a consecutive grouping of PRBs into a collection and may be used as a larger unit of resource blocks to be utilized.

As described herein, a RBG is a Resource Block Group. A Resource Block Group is a grouping of resource blocks into a collection. A RBG can have a size and a location based on the number of blocks in the grouping and the numbering of the RBG relative to other blocks.

As described herein, a RIV is a Resource Indication Value. A Resource Indication Value is a number used to denote a PDSCH or PUSCH resource allocation as represented by a numbering of resource blocks in a compressed format.

As described herein, a RRC is a Radio Resource Control. Radio Resource Control is a protocol utilized in 5G and other wireless configurations for establishing connection between devices, for example, a BS and a user equipment, using devices configurations and control planes.

As described herein, a SPS is a Semi-Persistent Scheduling. A Semi-Persistent Scheduling is a transmission paradigm wherein a BS allocates a set of resources and transmission formats to a user equipment in a semi-persistent manner over a time interval.

As described herein, TDM is Time Division Multiplexing. TDM is a communications-related paradigm for transmitting a plurality of different signals over a common medium via a series of interleaved packets distributed in a continuous stream to allow for near-simultaneous reception of data.

As described herein, U-PDSCH is Unicast-Physical Downlink Shared Channel. U-PDSCH may be, for example, a physical downlink shared channel associated with a unicast operation that may be performed in a one-to-one transmission configuration between a BS and a user equipment.

As described herein, a UE is a User Equipment. A User Equipment may be a device and/or hardware which will function as a reception and transmission point for signals exchanged with a BS as part of 5G communications. A UE may be, for example, a mobile device which may receive transmissions from a BS from variable locations. The term UE may be used interchangeably with client device herein.

As described herein, a VRB is a Virtual Resource Block. A Virtual Resource Block is a paradigm in wireless transmissions wherein the pairs of VRBs are mapped to PRB pairs as part of a distributed transmission scheme.

Example Processes

FIG. 1 is a flowchart illustrating an example process for decoding a GC-PDSCH according to a determined RB configuration. Specifically, FIG. 1 depicts an example flow for decoding a GC-PDSCH received, for example, at a UE from a BS, according to a RB configuration that is determined to solve inefficiencies when the UE is also receiving a U-PDSCH.

At 102 of example process 100, a unicast physical downlink shared channel (U-PDSCH) transmission and a group common physical downlink shared channel (GC-PDSCH) transmission. For example, a UE may receive the U-PDSCH and GC-PDSCH from a BS as part of a 5G data transmission protocol. Each channel may be received at a different times than other channels, which may cause overlap between decoding blocks for the U-PDSCH and GC-PDSCH by a UE.

At 104, a resource block (RB) configuration for decoding the U-PDSCH transmission and GC-PDSCH transmission is determined, wherein the RB configuration specifies a mapping of at least one of the U-PDSCH and the GC-PDSCH to one or more RB collections. Various embodiments for determining and implementing the RB configurations determined in step 104 are described herein. Various embodiments described allow for the decoding of GC-PDSCH in manners which remedy inefficiencies when both U-PDSCH and GC-PDSCH are received, and/or when GC-PDSCH blocks fall within, outsides of, of partially within a CFR. For example, the UE may determine the RB configuration based on the received U-PDSCH/GC-PDSCH and capabilities/specifications of the UE.

At 106, the GC-PDSCH within a Common Frequency Resource (CFR) is decoded according to the RB configuration determined in 104. For example, a UE may use the RB configuration determined in 104 to decode the GC-PDSCH transmission received in 102 to facilitate a 5G data transmission process.

The solutions described herein for determining configurations of RBGs, RB bundles, PRGs, etc. for MBS operations are parameter agnostic and can be applied independently or in combination with other solutions. The solutions described herein are also agnostic with respect to unicast frequency domain resource allocation types and MBS frequency domain resource allocation types (Type 0, Type 1, etc.), and can be applied when the unicast and MBS frequency resource allocation types are similar or different.

Defining Blocks Relative to the CRB
Determination of RBG Configurations Relative to CRB In various embodiments, the RBG configurations for MBS operations may be defined using size-configuration tables or similar correspondence mediums. Specifically, a new radio resource control (RRC) parameter may be generated and included in information element (IE), for example a PDSCH-config for MBS. The parameter would correspond to the size of a RBG relating to MBS and will be denoted by the symbol $MBS_{RBGSize}$. The symbol may include an indication of which configurations to be applied in a configuration table, such as the table below, in order to determine the nominal RBG size $P_{MBS}$ for MBS operations based at least in part on the size of CFR:

| CFR Size | Nominal RBG Size (Configuration 1) | Nominal RBG Size (Configuration 2) |
| --- | --- | --- |
| 1-36 | 2 | 4 |
| 37-72 | 4 | 8 |
| 73-144 | 8 | 16 |
| 145-275 | 16 | 16 |

In embodiments wherein $MB_{SRBGSize}$ is not, or cannot be provided, a UE receiving an MBS signal from a BS may use a previously defined or received RBG size parameter for unicast operations, for example through PDSCH configuration data utilized for unicast. In further embodiments, a predefined default value may be applied for $MBS_{RBGSize}$, for example in embodiments where neither a $MB_{SRBGSize}$ size nor a unicast size are available, in order to prevent a universal unicast value from placing restrictions on each UE in the same MBS group.

In various embodiments, the BS interacting with the UE may proactively determine that all UEs in the same MBS grouping have a compatible configuration for determining either $MB_{SRBGSize}$ or for deriving it based on a corresponding unicast size.

In various embodiments, $MB_{SRBGSize}$ may be determined using values relative to a CFR size and the first PRB within the CFR. In this case, $MB_{SRBGSize}$ may be defined according to CRB, and depending on the size of CFR and its initialization relative to the CRB. For example, $MB_{SRBGSize}$ may be determined according to the following equation:

$$N_{RBG} = \lceil (N_{CFR,i}^{size} + \mathrm{mod}\ P_{MBS}))/P_{MBS} \rfloor$$

where $N_{CFR,i}^{size}$ is the length of the PRBs of CFR and $N_{CFR,i}^{start}$ is the starting PRB referenced to Point A for the CFR, where Point A is corresponds to the center of a subcarrier at 0 belonging to the CRB at 0. Depending on the size of CFR and its initialization point relative to CRB, the first and last RBGs may have a difference size compared with the remaining RBGs. For example, RBGs sizes for MBS may follow the pattern: (1) the size of the first RBG for MBS in CFR is $RBG_{0,MBS}^{size} = P_{MBS} - N_{CFR,i}^{start}\ \mathrm{mod}\ P_{MBS}$, (2) the size of the last RBG for MBS in CFR is $RBG_{last,MBS}^{size} = (N_{CFR,i}^{size})\ \mathrm{mod}\ P_{MBS}$, if $RBG_{last,MBS}^{size} = (N_{CFR,i}^{start} + N_{CFR,i}^{size})\ \mathrm{mod}\ P_{MBS} > 0$ and $P_{MBS}$ otherwise, and (3) the size of all other RBGs for MBS in CFR is $P_{MBS}$.

Figure 2:
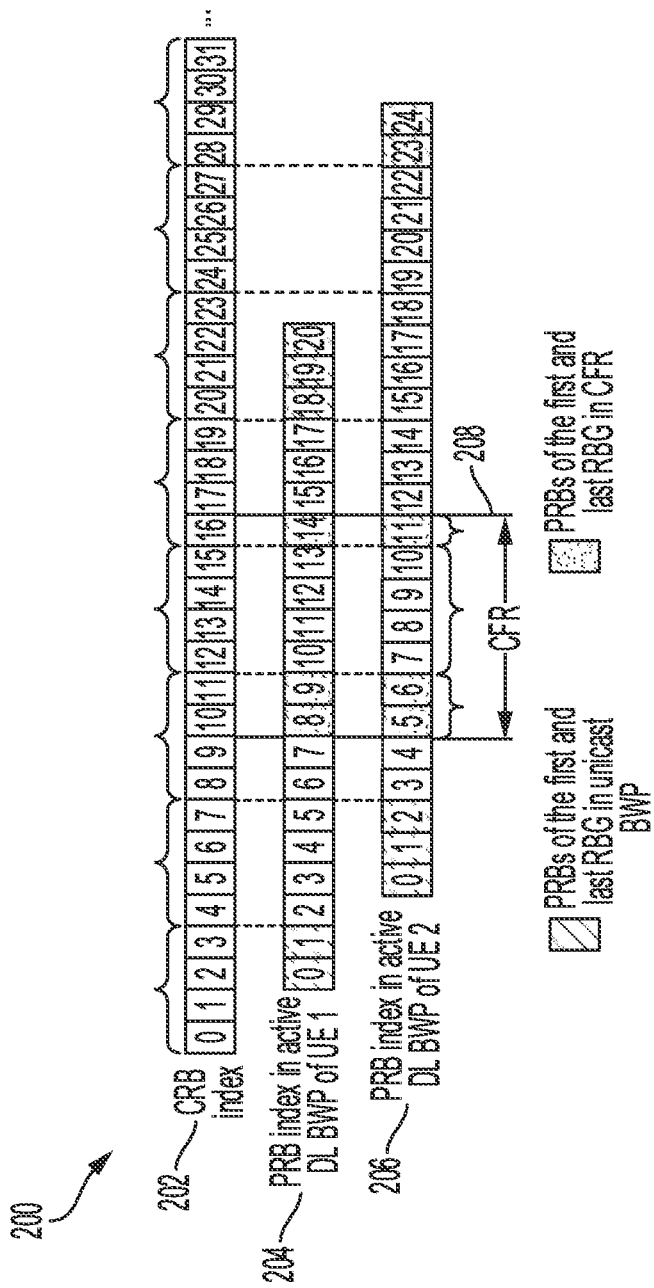
FIG. 2 is a block diagram illustrating determination of a resource block group configuration relative to a CRB index.

FIG. 2 is a block diagram illustrating determination of a resource block group configuration relative to a CRB index. Namely, FIG. 2 depicts an example block diagram 200 showing ordered sets of RBs for two UEs, UE1 and UE2, relative to the CRB index during an MBS operation. The CRB index 202 shows a representation of the CRB as a reference to the frequency domain. The common resource block 0 represents "point A" and is a starting reference point for all resource block grids, including those of UE. For example, FIG. 2 depicts the PRB index of UE1 204 and the PRB index of UE2 206 relative to CRB index 202. The common frequency resource 208 shows a portion of the coinciding resource block grid during which one or more receivers (e.g. UE1 and UE2) can common perform MBS reception.

As depicted in FIG. 2, the nominal RBG size for unicast and MBS blocks is 4. However, the first unicast RBG size for UE1 and UE2 are 2 and 3 RBs, respectively, due to the different start position for their unicast BWPs relative to the CRB index. Similarly, the last unicast RBG for UE1 and UE2 have 3 and 2 RBs, respectively for similar reasons. The remaining unicast RBGs for both UEs have 4 RBs.

Regarding MBS operations, as depicted in the CFR beginning at CRB index 10 and ending at CRB index 16, the size of the first and last MBS RBG in CFR is 2 RBs and 1 RB for UE1 and UE2, respectively. Thus, these RBG sizes are determined based on the size CFR and its initialization relative to the CRB index. As depicted in FIG. 2, two indexing methods are shown. The first indexing method is shown relative to the CRB, and the second indexing method is PRB indexing as performed relative to the BWP, for each UE. The depiction of block counting numbers for each UE beginning at different positions represents these differences.

In embodiments involving the use of RBG for MBS operations, the nominal size of unicast RBGs and MBS RBGs are the same. This may be beneficial to simplify UE implementation by using a similar size value for both sets of blocks to reduce UE performance latencies. In this case, the specifications of a UE may mandate that the nominal size of unicast RBG and MBS RBG are to be considered the same so that the UE is not required to be configured with different RBG sizes which will be determined at operational times.

In some embodiments, the BS is configured to enable the size of unicast RBG to differ from MBS RBG when communicating with the UEs in an MBS group. For example, the BS may communicate flexibly with the UEs to determine a more time or frequency efficient size for MBS RBGs that is different than the size of unicast RBGs. The determinations may be subject to UE capabilities, and may be collected, for example as part of capability report to indicate whether each UE, individually or as part of the group, supports such a feature. In some further embodiments, a UE may or may not be configured with an indication that the unicast RBG size will to differ from MBS RBG size, unless the UE indicates to support such feature.

Determination of RB Bundle Configurations Relative to CRB

In embodiments involving transmissions of type non-interleaved GC-PDSCH allocation type 1, the $n^{th}$ MBS VRB in CFR may be mapped to the $n^{th}$ PRB after the initialization of CFR. This may be equivalent to CRB $n+N_{CFR,i}^{start}$, $N_{CFR,i}^{start}$ is the starting PRB referenced to Point A. The indexing of MBS VRB may start from 0 to the CFR size $N_{CFR,i}^{size}$. In these cases, non-interleaved mapping is assumed as the default mapping type when no mapping scheme is indicated by higher layer parameter such as MBS-vrb-ToPRB-Interleaver in the PDSCH-config for MBS. The determination may be made independent of whether interleaved or non-interleaved mapping is used for unicast.

For example, an implementing UE may determine to utilize non-interleaved mapping despite utilizing interleaved mapping for separate unicast operations. In some further embodiments, the mapping is subject to UE capabilities as indicated in a capability report sent to a BS, for example to indicate whether UE support different mapping types for unicast and MBS. Alternatively, if such indications by MBS-vrb-ToPRB-Interleaver, for example, are not or cannot be provided, the UE may follow the same mapping approach (interleaved or non-interleaved) used for unicast by default. Additionally, some MBS DCI formats may specify a mapping format to be used by default such as DCI format 4_0 or DCI format 4_1. In some further embodiments, the BS may proactively coordinate with UEs to ensure that all UEs in the same MBS group apply the same mapping type.

In various embodiments utilizing non-interleaved mapping, MBS VRB may be indexed from 0 to the size of the CFR. In this case, the $n^{th}$ MBS VRB is mapped to the $n^{th}$ PRB after the initialization of CFR, which is equivalent to CRB $n+N_{CFR,i}^{start}$. In various embodiments, the non-interleaved mapping is the default mapping type if no other mapping type is indicated as part of PDSCH-config for MBS. Alternatively, the UE may follow the mapping type used for unicast or a predefined default value. In various embodiments, the mapping type (interleaved or non-interleaved) for unicast may differ from that for MBS subject to UE capabilities, either as measured by the UE or as determined by the BS based on information about UEs in the UE group.

In embodiments utilizing interleaved mapping, the MBS RB bundle size, $L_{MBS}$, may be indicated by a higher layer parameter in PDSCH-config for MBS. The possible size values to be indicated by a higher layer parameter may be standardized, for example 2, 4, etc. Additionally, the indicated value by higher layer parameter may be applied for a particular MBS DCI format, but a predefined value determined from a specification may be applied for other MBS DCI format, such as the first DCI format, which is based on DCI format 10 (such as DCI format 4_0 or DCI format 4_1), for example. The MBS VRBs indexed from 0 to the CFR size $N_{CFR,i}^{size}$, and the RBs within the CFR indexed from $N_{CFR,i}^{start}$ to $N_{CFR,i}^{size}$, for example, may be partitioned into an $N_{bundle}$ value that may be defined by the following equation:

$$N_{bundle} = \lceil (N_{CFR,i}^{size} + (N_{CFR,i}^{start} \bmod L_{MBS}))/L_{MBS} \rceil$$

For example, RB bundle sizes for MBS may be given as follows: (1) the size of the first bundle for MBS in CFR is $L_{MBS} - N_{CFR,i}^{start} \bmod L_{MBS}$, (2) the size of the last RBG for MBS in CFR is $(N_{CFR,i}^{start} + N_{CFR,i}^{size}) \bmod L_{MBS}$, if $(N_{CFR,i}^{start} + N_{CFR,i}^{size}) \bmod L_{MBS} > 0$ and $L_{MBS}$ otherwise, and (3) the size of all other bundles for MBS in CFR is $L_{MBS}$.

In various embodiments employing interleaved mapping, the RBs with the CFR are partitioned into bundles of size $L_{MBS}$ based on their relative position to CRB grid which results in that the first and last bundle may have fewer RBs than the remaining bundles in the CFR. If, for interleaving allocation, the MBS bundle size is not provided, the UE may apply an indicated value provided in PDSCH-config for unicast. In some embodiments where no value is specified, a UE may determine that non-interleaving mapping is to be used for MBS. In this case, to decouple the determination of bundle size between unicast and MBS in circumstances where such a value is not provided in a PDSCH-config for MBS, an inherent value of the bundle size may be predefined, i.e., provided in the specification of the UE or received independently by the BS. In some embodiments, the predefined value of the bundle size may be determined based on some rules such as CFR size as shown in the table below, for example:

| CFR Size | Bundle size |
| --- | --- |
| 1-36 | 0 (non-interleaved mapping) |
| 37-144 | 2 |
| 145-275 | 4 |

In some further embodiments, when the size of CFR is equal to the size of the corresponding BWP, the indicated bundle size for unicast may be utilized for MBS when an interleaving value is not provided in PDSCH-config for MBS. In some embodiments, the bundle size of unicast and MBS may be assumed to be the same to simplify UE implementations. For example, when the first DCI format based on DCI 1_0 (such as DCI format 4_0 or DCI format 4_1) schedules MBS, the MBS bundle size may be the same as that of unicast when DCI format 1_0 in CSS is used. Accordingly, when the second DCI format based on DCI 1_0 is used (such as DCI format 4_2), the MBS bundle size may be the same as that of the unicast value when DCI format 1_1 is used.

In various embodiments, some types of UE may indicate in a capability report that it is able to support different bundle size between unicast and MBS. For example, the bundle size for MBS PDSCH scheduled by the first DCI format or second DCI format may differ from unicast PDSCH scheduled by DCI 10 in CSS or DCI 1_1, respectively. This may be communicated from the UE to the BS to alter signal transmission operations.

In various embodiments, the bundle size of MBS may indicated by higher layer parameter separate from a unicast parameter value. If not provided, the determined value for unicast can be determined as the value, or the MBS bundle size may be determined based on a rule or rules that may are derived from determined UE capabilities.

Once the RB bundles for MBS are determined, interleaved mapping may follow the same procedures for unicast operations. For example, the MBS virtual RB bundle may be mapped to a physical resource bundle in a manner similar to those used in unicast operations. However, when calculating the parameter "$C=\lfloor N_{bundle}/R \rfloor$", in contrast to unicast, the $N_{bundle}$ value is determined for MBS operations separately from unicast operations to ensure that it is aligned among all UEs in the same MBS group. Failure to do so may cause misalignment between UEs in the same MBS group. In some embodiments, alignment regarding how the MBS VRB bundles are mapped PRB bundles among the UEs in the same MBS group is performed separately from unicast operations at the UE.

Determination of PRG Configurations Relative to CRB

In various embodiments, the consecutive RBs in a CFR may be divided into multiple $PRG_{MBS}$. In this case, a UE determines that the same precoder is applied to all RBs within the same $PRG_{MBS}$. Accordingly, the size of $PRG_{MBS}$ ($P'_{CFR,i}$) may be determined based on predefined rules or indicated by higher layer signaling. For example, $P'_{CFR,i}$ can take a value from {2, 4, wideband}. If value 2 or 4 is determined to be applied that $PRG_{MBS}$ consists of 2 or 4 PRBs, respectively. If value "wideband" is determined, the UE may assume the same precoding is applied is applied for whole MBS GC-PDSCH and it spans contiguous PRBs. For the determination of which value to be applied {2, 4, wideband}, the same procedure as the one for unicast may be used, but the size of CFR is used instead of the size of unicast BWP.

For example, when MBS PDSCH is scheduled/activated by a first DCI format (such as DCI format 4_0 or DCI format 4_1), the size of $PRG_{MBS}$ may be predefined in the specification for the UE and it may be equal 2 RBs. Higher layer parameters, for example in PDSCH-config for MBS, may indicate PRB bundle types and the size of the bundle. To determine PRB bundle type and its size, a similar procedure to the one used for unicast may be applied by applying $N_{CFR,i}^{size}$ instead of $N_{BWP,i}^{size}$.

In various further embodiments, if no information is provided about the $PRG_{MBS}$ in a PDSCH-config for MBS, a UE may apply a predefined bundling type for unicast, but apply $N_{CFR,i}^{size}$ instead of $N_{BWP,i}^{size}$. In this case, the BS may proactively ensure that all UEs in the same MBS group determine or are sent the same $P'_{CFR,i}$. Furthermore, a default predefined type and size may be applied for MBS PRG when no information is provided about the $PRG_{MBS}$ to decouple the type and size of MBS PRG and unicast PRG. Furthermore, the determined MBS PRG size may be restricted to be as same as unicast PRG size in embodiments where different UEs are capable of supporting that configuration and indicate as much in a capability report.

In some further embodiments, the MBS PRG consisting of consecutive RBs within CFR may be defined in a manner such that the UE can assume the same precoding is applied to all RBs within the same PRG. The size of MBS PRG may be indicated or determined based this configuration, and unicast PRG size may be used when no MBS PRG is configured. For example, RBs within CFR may be divided into PRGs based on their relative CRB indices. Consequently, the first and last PRG may have fewer RBs than the remaining PRGs in the CFR. Specifically, for $P'_{CFR,i}$ values other than "wideband", it may be based on (1) The size of the first PRG is $P'_{CFR,i} - N_{CFR,i}^{start} \mod P'_{CFR,i}$, (2) the size of the last PRG is $(N_{CFR,i}^{start} + N_{CFR,i}^{size}) \mod P'_{CFR,i}$ if $(N_{CFR,i}^{start} + N_{CFR,i}^{size}) \mod P'_{CFR,i} \neq 0$ and $P'_{CFR,i}$ otherwise, and (3) the size of the remaining PRGs is $P'_{CFR,i}$. The nominal sizes of MBS RBG and MBS bundle may be, for example, integer multiples of the size of MBS PRG.

Defining Blocks Relative to the CFR

In various embodiments, the determination/indication of the size of MBS RBGs, MBS bundles, or MBS PRGs can be defined relative to the CFR of MBS in a similar manner to the embodiments above describing definition relative to CRB.

Determination of RBG Configurations Relative to CFR

In various embodiments, RBG may be defined relative to the beginning of CFR rather than using CRB. In embodiments for defining RBG blocks relative to CFR, all RBGs within CFR have the same size that can indicated/determined as described in a manner similar to determinations with respect to CRB, except that one RBG that may have fewer RBs, e.g., the last RBG within the CFR. For example, block sizes may begin to be defined at the initialization of CFR, meaning the first RBG will have the nominal size of blocks. Thus, RBG size will depend on the size of CFR, but is independent of CFR's start position (the first block will always be of a nominal size).

Figure 3:
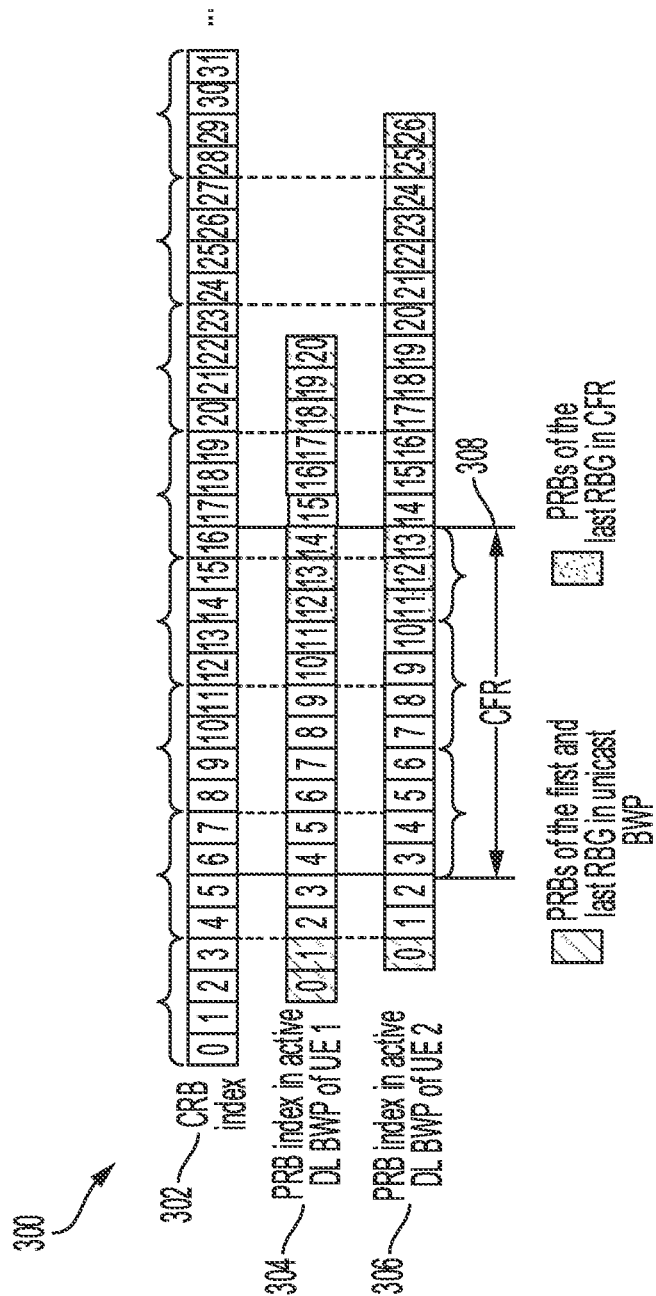
FIG. 3 is a block diagram illustrating determination of a resource block group configuration relative to a CFR.

FIG. 3 is a block diagram illustrating determination of a resource block group configuration relative to a CFR. Specifically, FIG. 3 illustrates a block diagram 300 embodiment wherein the nominal RBG size is determined/indicated to be 4 RBs. As depicted in FIG. 3, the CRB index 302 shows a representation of the CRB as a reference to the frequency domain, similar to 202. FIG. 3 also depicts the PRB index of UE1 304 and the PRB index of UE2 306 relative to CRB index 302. The common frequency resource 308 shows a portion of the coinciding resource block grid during which one or more receivers can common perform MBS reception.

As depicted in FIG. 3, all MBS RBGs have 4 RBs except the last RBG for both UE1 and UE2, which both have a last RBG of size 3 RBs. This is depicted by the grouped regions of CFR, which are independent of the grouped regions of CRB. Accordingly, the number of RBGs within CFR may be defined by $N_{RBG}=\lceil N_{CFR,i}^{size}/P_{MBS}\rceil$ where $N_{CFR,i}^{size}$ is the length PRBs of CFR and $P_{MBS}$s is the size of MBS RBG that can determined/indicated as described above. The last RBG will then have a size of $N_{CFR,i}^{size}$ mod $P_{MBS}$ if $N_{CFR,i}^{size}$ mod $P_{MBS}>0$ and $P_{MBS}$ otherwise. MBS RBG can be determined relative to the CFR wherein all MBS RBGs within CFR has the same number of RBs, except the last RBG that may have fewer RBs.

Determination of RB Bundle Configurations Relative to CFR

In various embodiments, MBS bundles may be also defined relative to CFR wherein all bundles consist of the same number RBs except the last bundle, which may have fewer RBs depending on the size of CFR. This depends on the size of CFR, but is independent of CFR's start position, as with RBG sizes. The bundle size, $L_{MBS}$, may be determined as described above with respect to the determinations relative to CRB, except measured from the initialization of CFR instead of the order of CRB. The MBS VRBs indexed from 0 to the CFR size $N_{CFR,i}^{size}$, and the RBs within the CFR indexed from $N_{CFR,i}^{start}$ to $N_{CFR,i}^{start}+N_{CFR,i}^{size}$, for example, may be partitioned into $N_{bundle}$ that may be defined as follows:

$$N_{bundle}=\lceil N_{CFR,i}^{size}/L_{MBS}\rceil$$

In various embodiments, all MBS bundles (VRB bundles or PRB bundles) have $L_{MBS}$ RBs except the last bundle, which has a size of $N_{CFR,i}^{size}$ mod $L_{MBS}$ if $N_{CFR,i}^{size}$ mod $L_{MBS}>0$ and $L_{MBS}$ otherwise. MBS bundle can be determined relative to the CFR wherein all MBS bundles within CFR has the same number of RBs, except the last bundle that may have fewer RBs.

Determination of PRG Configurations Relative to CFR

In various embodiments, the MBS PRG may be defined relative to CFR wherein all MBS PRGs within the CFR have the same size, $P'_{CFR,i}$, except the last PRG within the CFR for example. The size of MBS PRG may be determined/indicated disclosed above regarding PRG determination with respect to CRB, but based instead on the CFR. In this case, the size of MBS PRG within CFR depends on the size of CFR, but is independent of CFR's initialization position relative to CRB. The sizes of MBS PRG within the CFR may be defined as follows: all MBS PRG has $P'_{CFR,i}$ RBs except the last PRG, which has $N_{CFR,i}^{size}$ mod $P'_{CFR,i}$ if $N_{CFR,i}^{size}$ mod $P'_{CFR,i}>0$ and $P'_{CFR,i}$ otherwise. MBS PRG can be determined relative to the CFR wherein all MBS bundles within CFR has the same number of RBs, except the last MBS PRG that may have fewer RBs.

Defining Restrictions on CFR to Influence Block Configurations

In various embodiments, the determination/indication of the size of MBS RBG, MBS bundle, or MBS PRG is based on applied restrictions to the CFR. Specifically, the CFR for MBS may be altered to always start/end at the boundary of complete RBG, bundle or PRG. This is beneficial to avoid any special handling for RBG, RB bundle or PRG units within the CFR. Accordingly, the scheduler is somewhat restricted to comport with the alignment between blocks and CFR.

Figure 4:
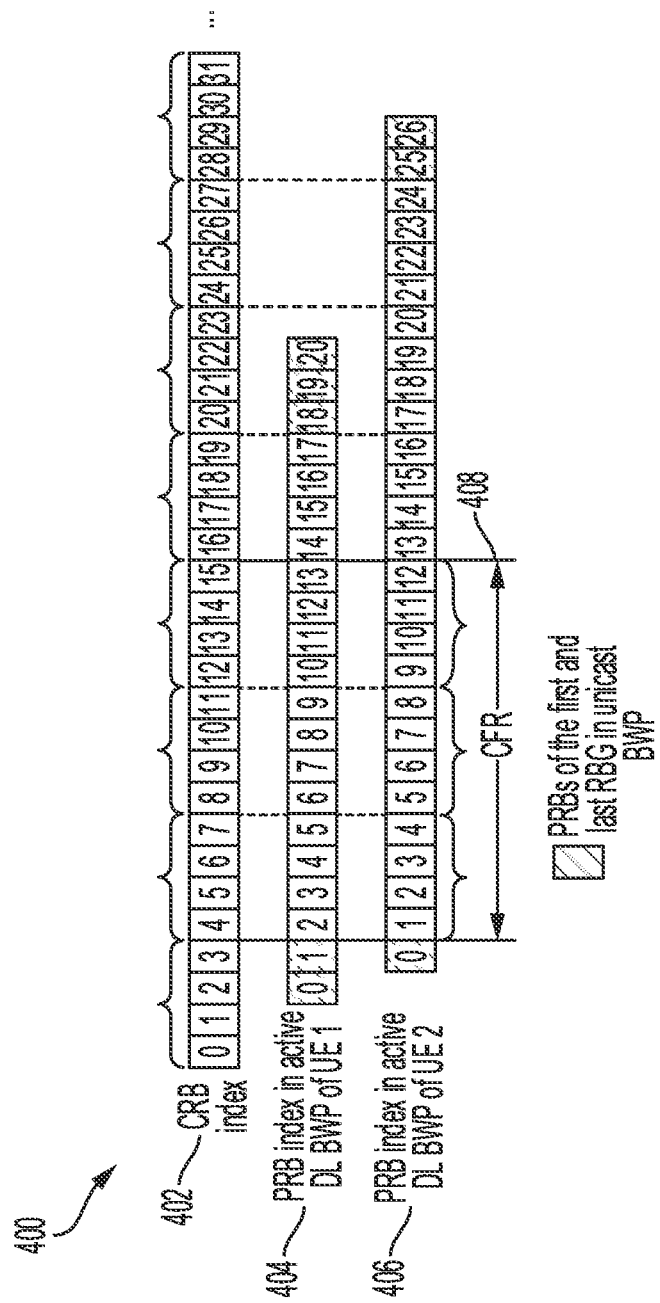
FIG. 4 is a block diagram illustrating determination of a resource block group based on the use of complete resource block groups.

FIG. 4 is a block diagram illustrating determination of a resource block group based on the use of complete resource block groups. Specifically, FIG. 4 illustrates an illustrated block diagram 400 in which the CFR starts/ends at the boundaries of complete RBGs containing 4 RBs. As depicted in FIG. 4, the CRB index 402 shows a representation of the CRB as a reference to the frequency domain, similar to 202. FIG. 4 also depicts the PRB index of UE1 404 and the PRB index of UE2 406 relative to CRB index 402. The common frequency resource 408 shows a portion of the coinciding resource block grid during which one or more receivers can common perform MBS reception.

In some embodiments employing the configuration depicted in FIG. 4, a base station may proactively correspond with one or more UEs to ensure the CFR implemented follows this rule for all UEs in the same MBS group. For example, as depicted in FIG. 4, the CFR is implemented to coincide with the CRB index at the beginning and ending of a 4-block sequence.

In this approach, the UE is not configured with CFR where its start/end is not aligned with a boundary of complete unicast RBG, unicast bundle, or unicast PRG. As a result, the BS is not restricted to always configure the size of MBS RBG, MBS bundle, or MBS PRG to be as same as that of unicast RBG, unicast bundle, or unicast PRG, respectively. Accordingly, the sizes of each can be integer multiples of, or inter-factor of, the unicast counterpart. Factors such as UE capability can be indicated in a capability report, for example, and used to determine the configurations.

In various embodiments, the beginning/end of CFR is aligned with beginning/end of complete unicast RBG, unicast bundle, or unicast PRG. In some embodiments, the size of MBS RBG, MBS bundle, or MBS PRG to be as same as that of unicast RBG, unicast bundle, or unicast PRG, respectively. In some embodiments, subject to UE capability, their sizes can be integer multiple of, or inter-factor of the unicast counterpart.

Improving Unicast Operations to Comport with MBS Configurations

In various embodiments, unicast PDSCH and MBS PDSCH can be implemented concurrently through FDM operations at a UE, and a BS can indicate whether the concurrent FDM unicast PDSCH and MBS PDSCH can occur within the same slot, or not (for example, Time Division Multiplexing, or TDM). In such embodiments, if a UE is configured/determined such that FDM unicast PDSCH and MBS PDSCH cannot occur within the same slot (i.e., unicast PDSCH and MBS PDSCH can only be utilized via TDM within the same slot), the UE may apply the corresponding configurations in determining RBG, bundle and PRG based on whether the UE is receiving unicast PDSCH or MBS PDSCH. Specifically, if a UE receives a unicast PDSCH channel, the UE may first apply a legacy unicast scheme to determine unicast RBG, unicast bundles, or unicast PRG.

In various embodiments, when unicast PDSCH and MBS PDSCH can only be subject to TDM within a slot of a UE, the UE applies a set of corresponding configurations to determine the unicast RBG, unicast bundles, or unicast PRG and the MBS RBG, MBS bundles, or MBS PRG, respectively. When unicast PDSCH and MBS PDSCH can be FDMed in the same slot, and the start/end of CFR does not align with the beginning/end of complete unicast RBG, unicast bundle, or unicast PRG, the UE may assume that unicast RBG, unicast bundle, or unicast PRG cannot be used for unicast PDSCH.

Figure 5:
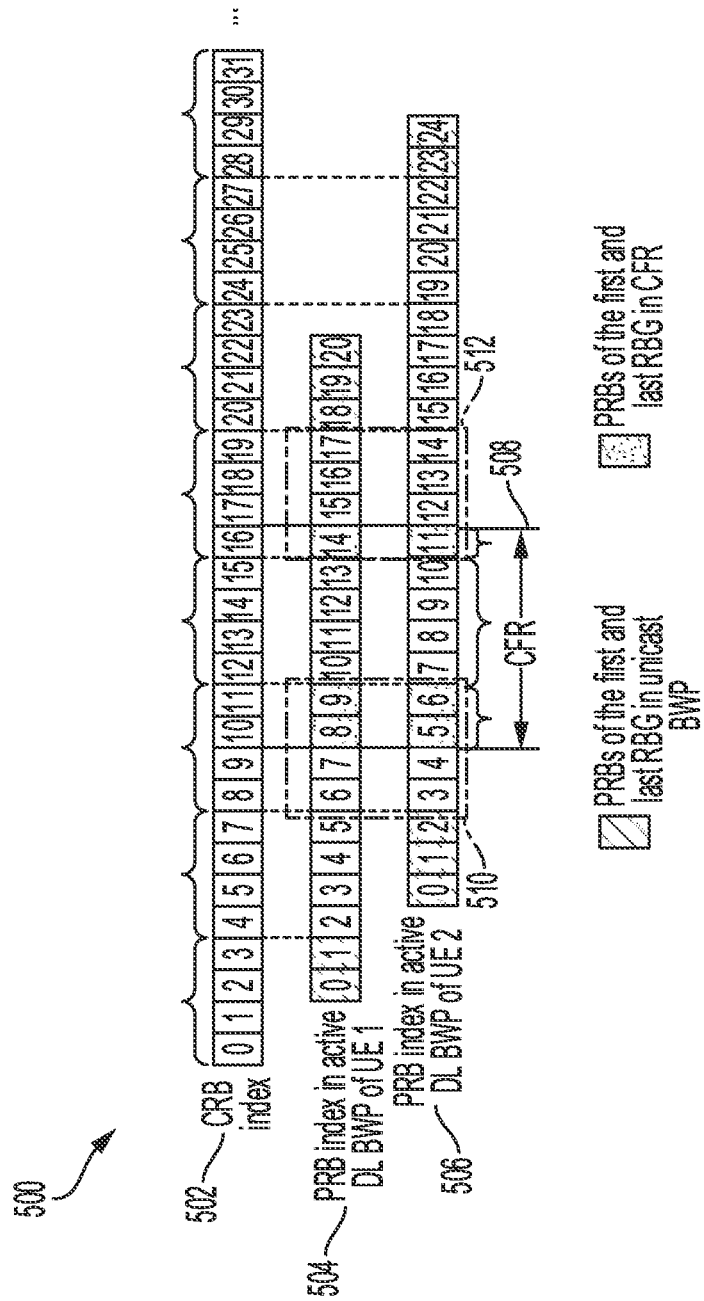
FIG. 5 is a block diagram illustrating conflicting U-PDSCH and GC-PDSCH blocks in CFR.

FIG. 5 is a block diagram illustrating conflicting U-PDSCH and GC-PDSCH blocks in CFR. Specifically, FIG. 5 depicts an illustrated block diagram 500 wherein the first and last RBG (depicted in the bolded boxes 510 and 512 in FIG. 5) cannot be used for unicast PDSCH and the whole unicast RBG can be used for unicast. As depicted in FIG. 5, the CRB index 502 shows a representation of the CRB as a reference to the frequency domain, similar to 202. FIG. 5 also depicts the PRB index of UE1 504 and the PRB index of UE2 506 relative to CRB index 502. The common frequency resource 508 shows a portion of the coinciding resource block grid during which one or more receivers can common perform MBS reception.

As depicted in FIG. 5, CRBs 8, 9, 17, 18, and 19 would be wasted for all UEs in the same MBS group because they would be neither used for unicast nor for MBS, as they fall outside CFR, while adjacent blocks fall within CFR. To remedy this inefficiency, the first and/or last MBS RBG (as shown in boxes 510 and 512 for example in 5), MBS bundle, or MBS PRG within the CFR cannot be used for MBS PDSCH and, in this case, the whole unicast RBG (as shown in boxes 510 and 512 for example in 5), unicast bundle, or unicast PRG can be used for unicast.

In various embodiments, for FDM-implemented unicast PDSCH and MBS PDSCH operations, scheduling restriction can be imposed on the unicast RBG, unicast bundle, or unicast PRG which CFR starts in or ends at. In the case of a UE that supports reception from multiple TRPs, the UE may determine that the whole unicast RBG (for example the bolded boxes 510 and 512 in FIG. 5), unicast bundle, or unicast PRG can be used for unicast, and the first or last MBS RBG (for example the bolded boxes 510 and 512 in FIG. 5), MBS bundle, or MBS PRG within the CFR can be used for MBS PDSCH.

In various embodiments, UEs supporting m-TRP reception can receive the FDMed unicast PDSCH and MBS PDSCH in any unicast/MBS RBG, unicast/MBS bundle, or unicast/MBS PRG including those at the boundaries of the CFR.

Alternatively, unicast RBG, unicast bundle, or unicast PRG for which CFR initializes or terminates can divided into two portions by the beginning/ending of the CFR. Each portion may be treated as a separate unicast RBG, unicast bundle, or unicast PRG.

Figure 6:
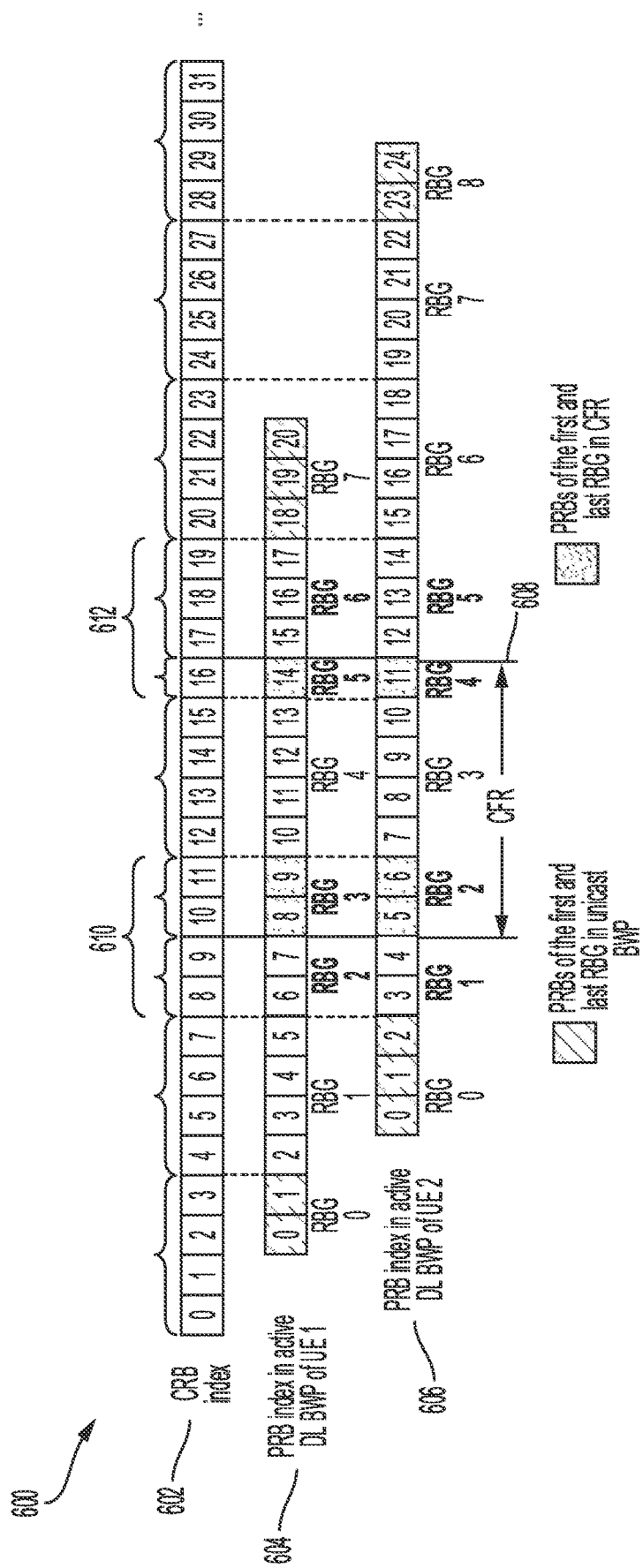
FIG. 6 is a block diagram illustrating the division of U-PDSCH into multiple RBGs based on the boundaries of CFR.

FIG. 6 is a block diagram illustrating the division of U-PDSCH into multiple RBGs based on the boundaries of CFR. Specifically, FIG. 6 depicts an illustrated block diagram 600 in which, RBs (represented by brackets 610 and 612) are divided into two unicast RBGs. As depicted in FIG. 6, the CRB index 602 shows a representation of the CRB as a reference to the frequency domain, similar to 202. FIG. 6 also depicts the PRB index of UE1 604 and the PRB index of UE2 606 relative to CRB index 602. The common frequency resource 608 shows a portion of the coinciding resource block grid during which one or more receivers can common perform MBS reception.

For unicast Type-0 PDSCH allocation, additional bits in FDRA field are needed to enable those RBG to be individually addressable. As depicted in FIG. 6, with respect to UE 1, a first/MSB is mapped to RBG 0, a second MSB is mapped to RBG 1, a third MSB is mapped to RBG 2, a fourth MSB is mapped to RBG 3, etc. For unicast Type-1 PDSCH allocation scheduled by DCI format 1_2, the RIV corresponds to RBG instead of individual RBs in the case of DCI formats 1_1 or 1_0. Therefore, in this case, the resultant RBGs after the division may still be counted as one RBG even though they have fewer RBs that other RBGs.

In some embodiments, the boundaries of CFR divides the unicast RBG, unicast bundle, or unicast PRG into two or more portions, wherein each portion divided can be addressed separately. In some further embodiments employing unicast Type-0 PDSCH allocations, the bitwidth of an FDRA field is increased corresponding to how many RBGs are divided by the boundaries of CFR. Additionally, the definition unicast RBG, unicast bundle, or unicast PRG which CFR starts in or ends can be as same as that other unicast counterpart (for example, the RBG in brackets 610 and 612 depicted in FIG. 6). Accordingly, the definition remains the same as if no CFR exists, however, when they are included in any unicast downlink grant, a UE may assume that only RBs outside CFR are implemented, even if the whole unicast RBG, unicast bundle, or unicast PRG is indicated.

As an additional example, when unicast RBGs (such as brackets 610 and 612 in FIG. 6) are allocated for unicast DL, only CRBs (pairs{8, 9} and {17, 18, 19} in FIG. 6) may be utilized for unicast PDSCH. Accordingly impact to the DCI fields or impact to how counting procedures of RIV for type 1 allocation is minimized. This embodiment (only using the RBs outside CFR for unicast) may be applied whenever CFR is present within unicast BWP. For example, when no scheduled MBS GC-PDSCH occupying some of the RBs of unicast RBG, unicast bundle, or unicast PRG in which CFR initializes or terminates, then the whole unit may be used for unicast operations.

Figure 7A:
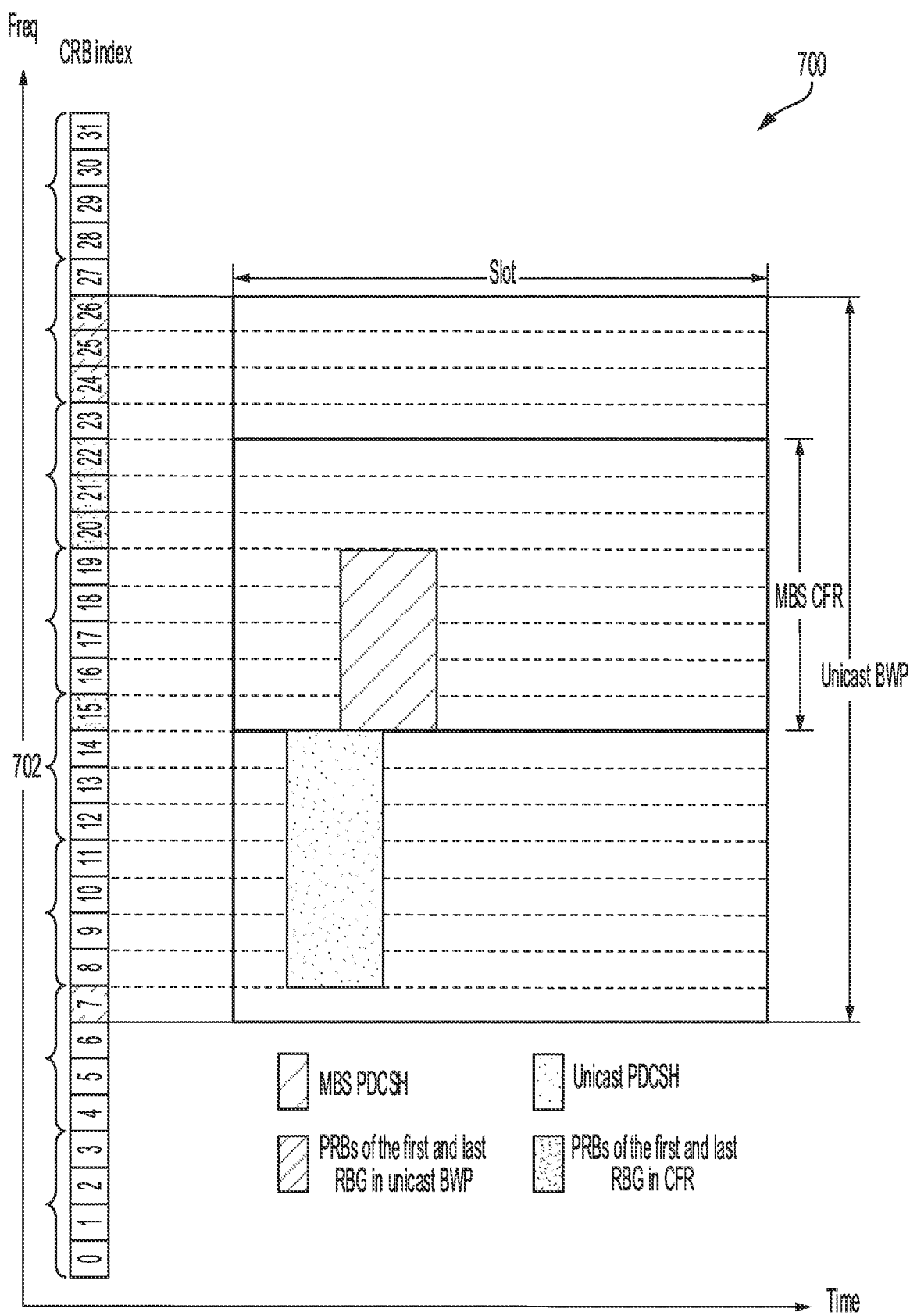
FIG. 7A is a block diagram illustrating sharing of a unicast RGB boundary between U-PDSCH and GC-PDSCH.
Figure 7B:
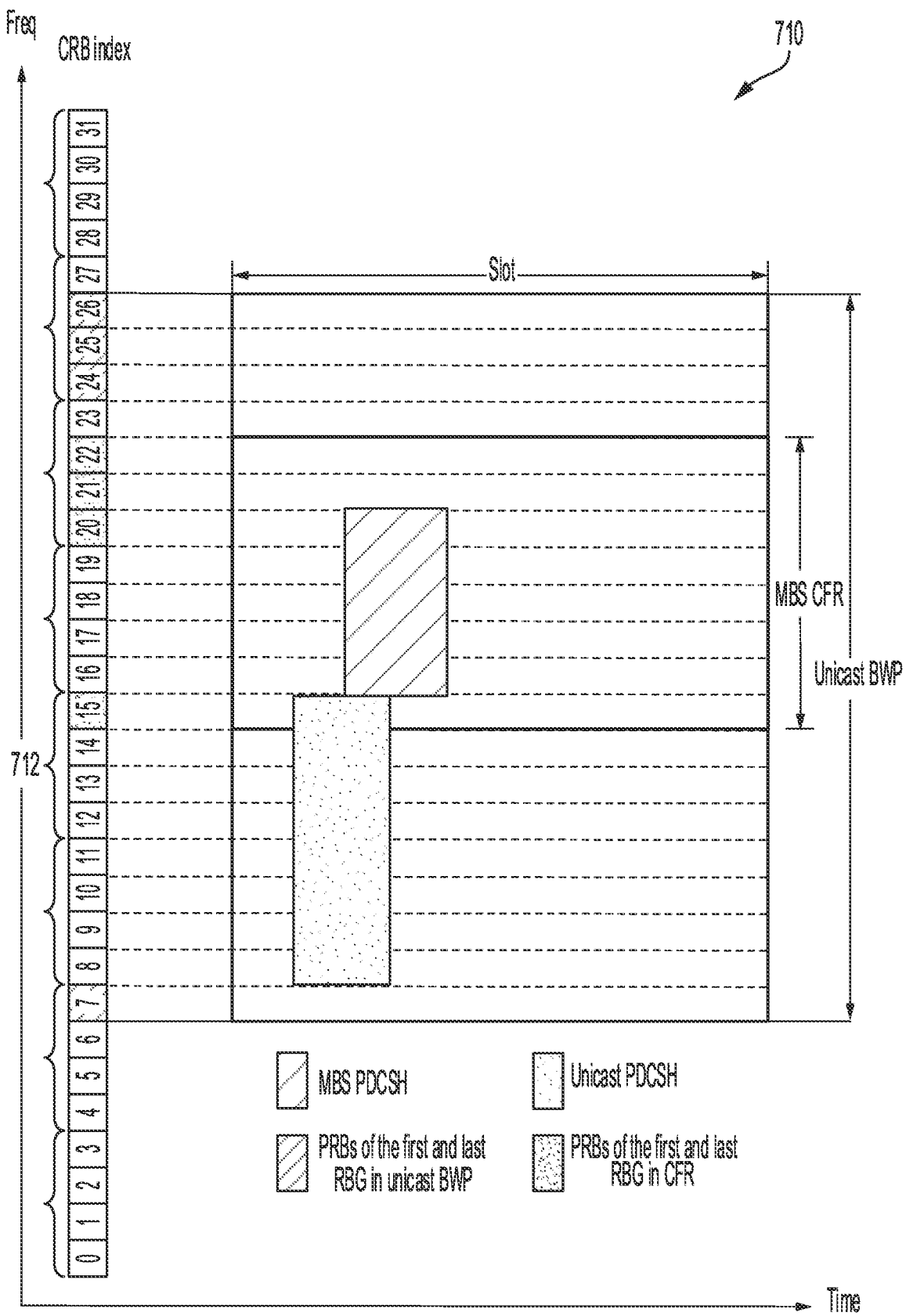
FIG. 7B is block diagram illustrating prevention of sharing of a unicast RGB boundary between U-PDSCH and GC-PDSCH.

FIG. 7A is a block diagram illustrating sharing of a unicast RGB boundary between U-PDSCH and GC-PDSCH. Specifically, FIG. 7A illustrates a block diagram 700 in which CRB 15 is used for MBS PDSCH. In this illustrated example, when unicast RBG allocates unicast RBG marked by bracket 702, only CRBs {12, 13, 14} are allocated for unicast PDSCH even if the whole unicast RBG is allocated for unicast PDSCH. FIG. 7B is block diagram illustrating prevention of sharing of a unicast RGB boundary between U-PDSCH and GC-PDSCH. Specifically, FIG. 7B illustrates a block diagram 710 in which none of CRBs of the unicast RBG marked with bracket 712 is used for MBS PDSCH. Consequently, the whole unicast RBG can be used for unicast PDSCH.

Figure 7C:
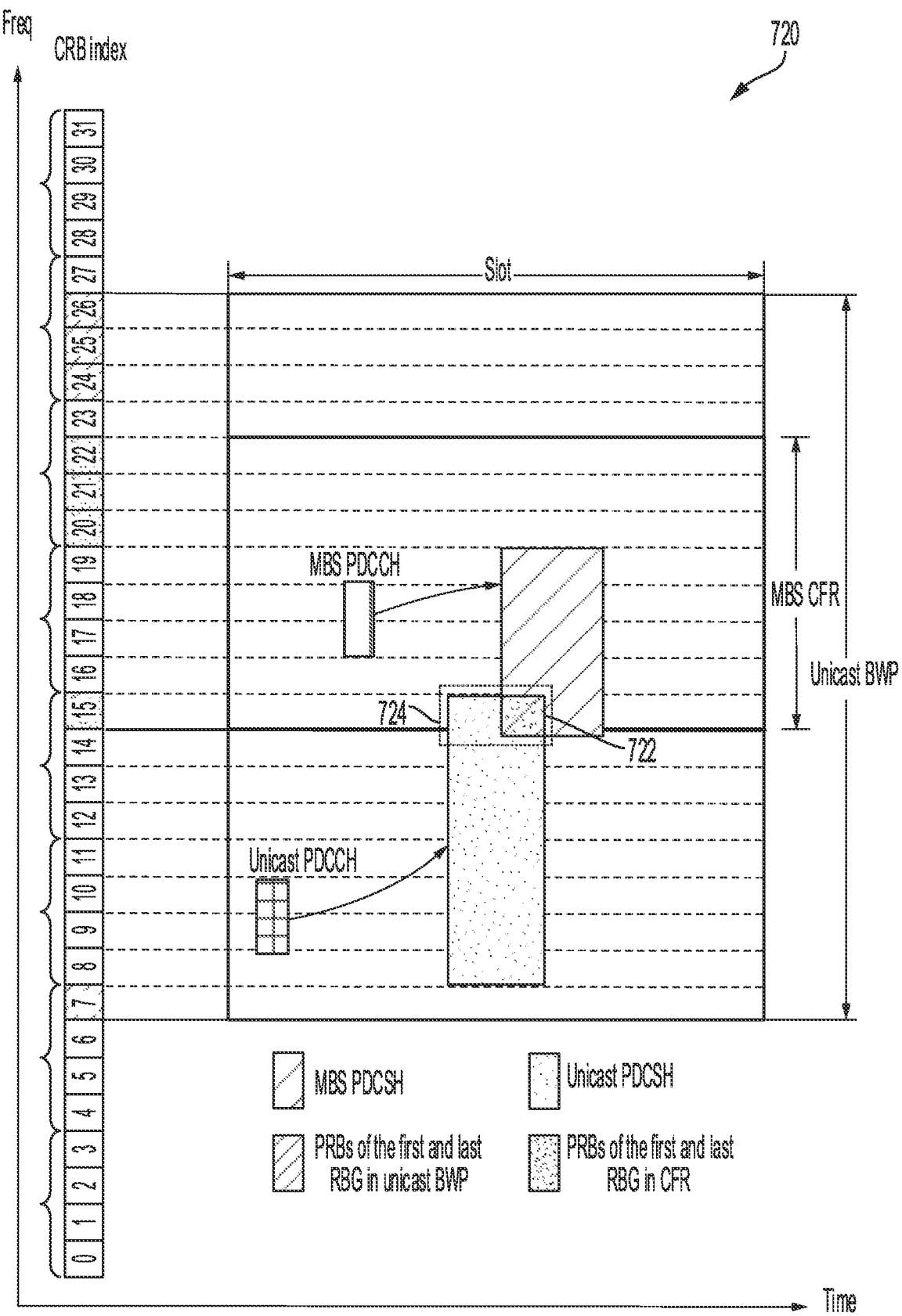
FIG. 7C is a block diagram illustrating an overlap between U-PDSCH and GC-PDSCH in CFR.

In some embodiments, after the BS schedules unicast PDSCH spanning the whole unicast RBG, unicast bundle, or unicast PRG in which CFR initializes or terminates, the BS schedules MBS PDSCH that will occupy the RBs within that those unicast units. FIG. 7C is a block diagram illustrating an overlap between U-PDSCH and GC-PDSCH in CFR. Specifically, FIG. 7C depicts a block diagram 720 in which the BS schedules MBS PDSCH that occupies RBs within unicast units. Accordingly, a UE behavior may define how such a scheduling will occur. In some embodiments, the UE will consider this case an error case, wherein the UE does not expect this situation (the overlapping depicting by box 722 in FIG. 7C, for example) to occur.

In some further embodiments the UE will react with a rate matching/puncturing case. In such cases, because other UEs in the same MBS group are not aware of the unicast PDSCH of each individual UEs in the MBS group, the rate matching/puncturing may occur to unicast PDSCH. Specifically, the UE may rate match/puncture the unicast PDSCH around an overlap (box 722 in FIG. 7C). In some embodiments, the rate matching/puncturing can occur for all RBs that partially or fully overlap with MBS PDSCH across all the symbols of unicast PDSCH. This will result in the unicast PDSCH to keep the uniform rectangular shape (as illustrated by box 724 in FIG. 7C).

In some further embodiments, the UE may react with a dropping case. In this embodiment, the UE will cancel the reception of the unicast PDSCH or MBS PSDCH. A determination of which of the unicast or MBS PSDCH to cancel may depend on several factors such the priority, the start symbol, the duration, which operation is scheduled earlier, which is semi-persistent scheduling (SPS) or dynamic grant, the percentage of the overlap to allocated resource, etc. For example, UE may cancel the reception of PDSCH with a lower priority than another PDSCH. In other examples, the UE may cancel the reception of the PDSCH that is configured as SPS and receive the other one that is scheduled as dynamic grant. Additionally, the unicast PDSCH may always be dropped. Similar rules may be applied to determine which PDSCH should be rate matched or punctured.

In some embodiments, which behavior to apply may depend on particular timeline. For example, if UE receives MBS PDCCH very close to unicast PDSCH, then this could mean that BS did not have time to alter the unicast PDSCH and perform rate matching. In this case, puncturing will be applied.

To enable the aforementioned schemes/cases to function properly, the UE may reliably decode any candidate MBS PDCCH that may be transmitted after scheduling unicast PDSCH. Otherwise, collision between unicast PDSCH and MBS PDSCH may occur, and the UE may not be aware of the collision due to missing the MBS PDCCH. In some cases, if there is misalignment between UE and the BS due to missing MBS PDCCH, some of the aforementioned cases may be better suited to resolving the issue than others. For example, when the misalignment above occurs, rate-matching may not correct the misalignment efficiently due to the unicast bits shifting due to applying rate matching because of the presence of MBS PDSCH. However, when the UE misses MBS PDCCH, UE will not be aware of the shift of unicast bits due to rate matching which results in failure in decoding unicast PDSCH. Therefore, the supporting of the aforementioned solutions may be subject UE capability that may be indicated as part of UE's capability report, for example.

Facilitating the aforementioned solutions may depend on the reception reliability of MBS PDCCH, e.g., the channel condition at the UE, the used configurations for MBS PDCCH transmission such as aggregation level, the used precoding method for DMRS of MBS PDCCH, etc. Therefore, it may be beneficial for a BS to indicate which procedure should be applied to handle a collision between unicast PDSCH and MBS PDSCH (rate-matching case, puncturing case, dropping case, etc.) in static, semi-static, or dynamic manner. For example, higher layer parameter such as FDMed-MBS-Unicast for example, may indicate which procedure to apply or to enable/disable particular procedure when unicast PDSCH and MBS PDSCH are FDMed. Also, medium access control element-control element (MAC-CE) may be used to carry such indication. Even this can be indicated in the scheduling DCI.

If the collision between unicast PDSCH and MBS PDSCH occurs, it may span multiple orthogonal frequency domain multiplexing (OFDM) symbols (to be wide in time domain), but occupy few RBs (to be narrow in frequency domain). Consequently, the potential collision may affect several codeblock groups (CBGs), which in turn increase the number of CBGs that should be retransmitted. Therefore, it is beneficial to alter the manner in which CBGs are mapped to physical resources. As an alternative to the mapping CBGs to frequency domain first and time domain second, CBGs may be mapped to time domain first and frequency domain second. This mapping approach may negative affects the decoding time, as a UE has to wait until reception of all PDSCH before start decoding CBGs. Therefore, it is beneficial to enable the BS to indicate which CBG mapping procedure should be applied depending on the network situation. For example, if the collision probability between unicast PDSCH and MBS PDSCH is low, then legacy CBG mapping method may be applied. Otherwise, the aforementioned CBG mapping method may be applied. Which CBG mapping method to be applied may be indicated in a static (e.g., higher layer parameter such as RRC parameter), semi-static (e.g., MAC-CE), or dynamic (e.g., the scheduling DCI) manner. When the new CBG mapping method is applied, PDSCH processing time may be relaxed to provide the UE with more time to decode PDSCH.

Example Systems

Figure 8:
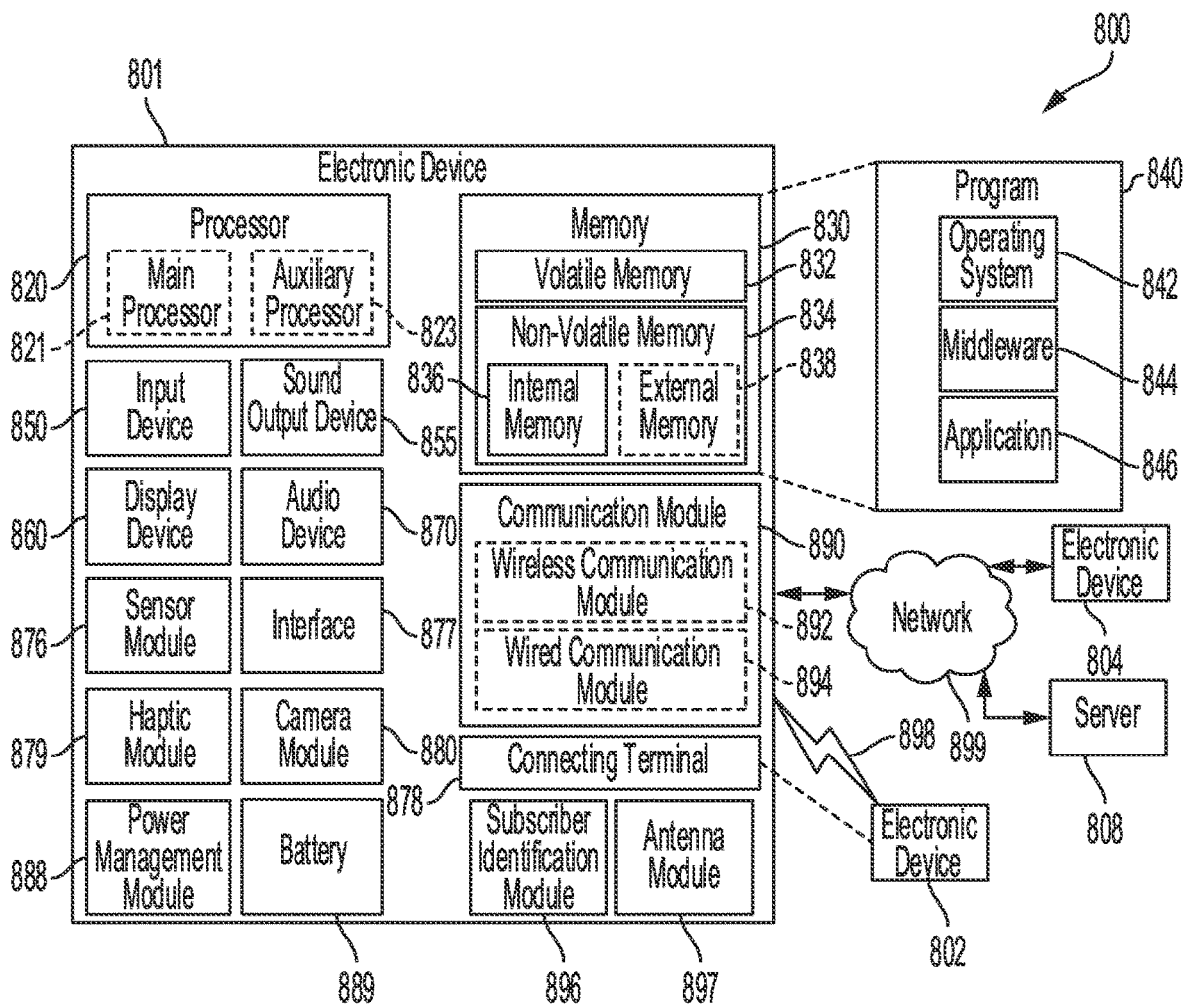
FIG. 8 is a block diagram of an electronic device in a network environment, according to one embodiment

FIG. 8 is a block diagram of an electronic device in a network environment, according to one embodiment. Referring to FIG. 8, an electronic device 801 in a network environment 800 may communicate with an electronic device 802 via a first network 898 (e.g., a short-range wireless communication network), or an electronic device 804 or a server 808 via a second network 899 (e.g., a long-range wireless communication network). The electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In one embodiment, at least one (e.g., the display device 860 or the camera module 880) of the components may be omitted from the electronic device 801, or one or more other components may be added to the electronic device 801. Some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. As at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. The processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep)

state, or together with the main processor 821 while the main processor 821 is in an active state (e.g., executing an application). The auxiliary processor 823 (e.g., an ISP or a CP) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by another component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. The display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. The audio module 870 may obtain the sound via the input device 850, or output the sound via the sound output device 855 or a headphone of an external electronic device 802 directly (e.g., wired) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. The sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device 802 directly (e.g., wired) or wirelessly. The interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device 802. The connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. The haptic module 879 may include, for example, a motor, a piezoelectric element, or an electrical stimulator.

The camera module 880 may capture a still image or moving images. The camera module 880 may include one or more lenses, image sensors, ISPs, or flashes.

The power management module 888 may manage power supplied to the electronic device 801. The power management module 888 may be implemented as at least part of, for example, a power management integrated circuit (PMIC).

The battery 889 may supply power to at least one component of the electronic device 801. The battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more CPs that are operable independently from the processor 820 (e.g., the AP) and supports a direct (e.g., wired) communication or a wireless communication. The communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. The antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 801 and the external electronic device 804 via the server 808 coupled with the second network 899. Each of the electronic devices 802 and 804 may be a device of a same type as, or a different type, from the electronic device 801. All or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

One embodiment may be implemented as software (e.g., the program 840) including one or more instructions that are stored in a storage medium (e.g., internal memory 836 or external memory 838) that is readable by a machine (e.g., the electronic device 801). For example, a processor of the electronic device 801 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

Figure 9:
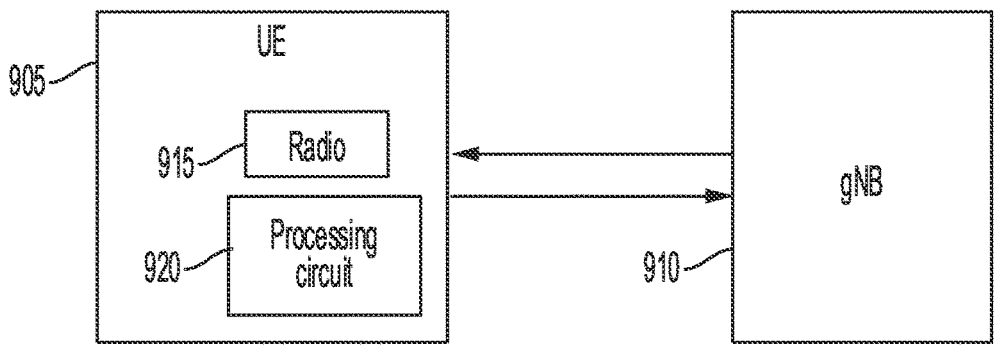
FIG. 9 shows a system including a UE and a gNB, in communication with each other.

FIG. 9 shows a system including a UE 905 and a gNB 910, in communication with each other. The UE may include a radio 915 and a processing circuit (or a means for processing) 920, which may perform various methods disclosed herein, e.g., the method illustrated in FIG. 1. For example, the processing circuit 920 may receive, via the radio 915, transmissions from the network node (gNB) 910, and the processing circuit 920 may transmit, via the radio 915, signals to the gNB 910.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
    receiving a unicast physical downlink shared channel (U-PDSCH) transmission and a group common physical downlink shared channel (GC-PDSCH) transmission;
    determining a resource block (RB) configuration for decoding the U-PDSCH transmission and the GC-PDSCH transmission, wherein the RB configuration specifies a mapping of at least one of the U-PDSCH transmission and the GC-PDSCH transmission to one or more RB collections; and
    decoding the GC-PDSCH transmission within a Common Frequency Resource (CFR) according to the RB configuration,
    wherein a size and a location for the one or more RB collections is determined based at least in part on a common resource block (CRB) and a start and a size of the CFR.

2. The method of claim 1, wherein the determined RB configuration includes a specification of the size and the location for the one or more RB collections to which at least one of the U-PDSCH transmission and the GC-PDSCH transmission is mapped.

3. The method of claim 2, wherein
    a first and last group of RBs in the RB collections have different sizes than remaining groups of RBs in the RB collections.

4. The method of claim 2, wherein the size of the one or more RB collections is determined based at least in part on the CFR of the GC-PDSCH transmission.

5. The method of claim 2, wherein the one or more RB collections are organized as resource block groups (RBGs) for the GC-PDSCH transmission and have a size provided by a higher layer signalling and determined separately from a resource block group (RBG) size for the U-PDSCH transmission.

6. The method of claim 2, wherein the one or more RB collections are organized as resource block groups (RBGs)

for the GC-PDSCH transmission and have having a size that is not separately configured, and
wherein a configured size of a resource block group (RBG) for the U-PDSCH transmission is used as a size of the RBGs for the GC-PDSCH transmission.

7. The method of claim 2, wherein the one or more RB collections are organized as RB bundles corresponding to an interleaved-mapping or non-interleaved-mapping for the GC-PDSCH transmission and have a size provided by a higher layer signalling determined separately from a size for the U-PDSCH transmission.

8. The method of claim 7, wherein the interleaved-mapping includes a parameter corresponding to a number of bundles within the CFR.

9. The method of claim 2, wherein:
the one or more RB collections are organized as precoding RB groups corresponding to a precoding granularity size for the GC-PDSCH transmission that can be separately configured from a size used for the U-PDSCH transmission; and
the one or more RB collections are organized as precoding RB groups corresponding to a precoding granularity size for the GC-PDSCH transmission, and the precoding granularity size is a precoding granularity size of the U-PDSCH transmission.

10. The method of claim 9, wherein the precoding granularity size for the GC-PDSCH transmission is of a predefined size of 2 blocks and according to DCI format 4_0 or DCI format 4_1.

11. A user equipment (UE) device comprising:
a processor; and
a non-transitory computer readable storage medium storing instructions that, when executed, cause the processor to:
receive a unicast physical downlink shared channel (U-PDSCH) transmission and a group common physical downlink shared channel (GC-PDSCH) transmission;
determine a resource block (RB) configuration for decoding the U-PDSCH transmission and the GC-PDSCH transmission, wherein the RB configuration specifies a mapping of at least one of the U-PDSCH transmission and the GC-PDSCH transmission to one or more RB collections; and
decode the GC-PDSCH transmission within a Common Frequency Resource (CFR) according to the RB configuration,
wherein a size and a location for the one or more RB collections is determined based at least in part on a common resource block (CRB) and a start and a size of the CFR.

12. The UE device of claim 11, wherein the determined RB configuration includes a specification of the size and the location for the one or more RB collections to which at least one of the U-PDSCH transmission and the GC-PDSCH transmission is mapped.

13. The UE device of claim 12, wherein
a first and last group of RBs in the RB collections have different sizes than remaining groups of RBs in the RB collections.

14. The UE device of claim 12, wherein the size for the one or more RB collections is determined based at least in part on the CFR of the GC-PDSCH transmission.

15. The UE device of claim 12, wherein the one or more RB collections are organized as resource block groups (RBGs) for the GC-PDSCH transmission and have a size provided by a higher layer signalling and determined separately from a resource block group (RBG) size for the U-PDSCH transmission.

16. The UE device of claim 12, wherein the one or more RB collections are organized as resource block groups (RBGs) for the GC-PDSCH transmission and have a size that is not separately configured, and
wherein a configured size of a resource block group (RBG) for the U-PDSCH transmission is used as a size of the RBGs for the GC-PDSCH transmission.

17. The UE device of claim 12, wherein the one or more RB collections are organized as RB bundles corresponding to an interleaved-mapping or non-interleaved-mapping for the GC-PDSCH transmission and have a size provided by a higher layer signalling determined separately from a size for the U-PDSCH transmission.

18. The UE device of claim 17, wherein the interleaved-mapping includes a parameter corresponding to a number of bundles within the CFR.

19. The UE device of claim 12, wherein:
the one or more RB collections are organized as precoding RB groups corresponding to a precoding granularity size for the GC-PDSCH transmission that can be separately configured from a size used for the U-PDSCH transmission; and
the one or more RB collections are organized as precoding RB groups corresponding to a precoding granularity size for the GC-PDSCH transmission, and the precoding granularity size is a precoding granularity size of the U-PDSCH transmission.

20. A non-transitory computer-readable storable medium comprising instructions which, when executed by a processor, cause the processor to perform:
receiving a unicast physical downlink shared channel (U-PDSCH) transmission and a group common physical downlink shared channel (GC-PDSCH) transmission;
determining a resource block (RB) configuration for decoding the U-PDSCH transmission and the GC-PDSCH transmission, wherein the RB configuration specifies a mapping of at least one of the U-PDSCH transmission and the GC-PDSCH transmission to one or more RB collections; and
decoding the GC-PDSCH transmission within a Common Frequency Resource (CFR) according to the RB configuration,
wherein a size and a location for the one or more RB collections is determined based at least in part on a common resource block (CRB) and a start and a size of the CFR.

* * * * *